US007216230B2

(12) United States Patent
Suzuki et al.

(10) Patent No.: US 7,216,230 B2
(45) Date of Patent: May 8, 2007

(54) DATA SECURING COMMUNICATION APPARATUS AND METHOD

(75) Inventors: Takashi Suzuki, Lafayette, CA (US); Takeshi Yoshimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 728 days.

(21) Appl. No.: 10/333,748

(22) PCT Filed: Apr. 22, 2002

(86) PCT No.: PCT/JP02/03980

§ 371 (c)(1),
(2), (4) Date: Jan. 29, 2003

(87) PCT Pub. No.: WO02/086847

PCT Pub. Date: Oct. 31, 2002

(65) Prior Publication Data

US 2003/0167394 A1 Sep. 4, 2003

(30) Foreign Application Priority Data

Apr. 20, 2001 (JP) ............................. 2001-122610

(51) Int. Cl.
*H04L 29/08* (2006.01)
*H04L 12/56* (2006.01)
*H04L 29/06* (2006.01)

(52) U.S. Cl. .................. 713/170; 713/168; 713/151

(58) Field of Classification Search .............. 713/170, 713/151, 168
See application file for complete search history.

(56) References Cited

U.S. PATENT DOCUMENTS 6,070,245 A    5/2000  Murphy, Jr. et al.
6,154,840 A   11/2000  Pebley et al.
6,829,254 B1* 12/2004  Rajahalme et al. ......... 370/535
6,918,034 B1*  7/2005  Sengodan et al. .......... 713/160
6,950,445 B2*  9/2005  Svanbro et al. ............ 370/477
2001/0052072 A1* 12/2001  Jung ......................... 713/160
2003/0005284 A1*  1/2003  Euchner ..................... 713/152
2003/0065917 A1*  4/2003  Medvinsky et al. ........ 713/160
2003/0221099 A1* 11/2003  Medvinsky et al. ........ 713/153

FOREIGN PATENT DOCUMENTS

| EP | 1 041 823   | 10/2000 |
| JP | 62-12227    | 1/1987  |
| JP | 2000-287192 | 10/2000 |

(Continued)

OTHER PUBLICATIONS

Parris, Colin J. "Using SNMP to Manage Guaranteed Performance Connections." IEEE(1995):132-139.*

(Continued)

*Primary Examiner*—Gilberto Barron
*Assistant Examiner*—Venkat Perungavoor
(74) *Attorney, Agent, or Firm*—Oblon, Spivak, McClelland, Maier & Neustadt, P.C.

(57) ABSTRACT

An object to be encrypted is decided in accordance with the type of input data and transfer characteristic of a network connected, and communication is performed with a communication mate by sharing parameters including an encryption object range and a data verification range in accordance with the object to be encrypted.

22 Claims, 10 Drawing Sheets

FOREIGN PATENT DOCUMENTS

WO          98/47263        10/1998
WO          WO 00/31964      6/2000

OTHER PUBLICATIONS

Hirokazu Okano, et al., "Multi-Information Partial-Encryption System", The Institute of Electronics, Technical Report of IEICE, vol. 93, No. 384, Dec. 15, 1993, pp. 25-30 (with English Abstract).

Patent Abstracts of Japan, JP 62-012227, Jan. 21, 1987.

Nobuichi Ikeno, et al., "Modern Encryption Theory", The Institute Electronics, Information and Communication Engineers, Jun. 10, 1987, pp. 223-225 (with full English translation).

Hirokazu Okamura et al.: "Multi joho bubun angoka system" The Institute of Electronics, Information and Communication Engineers Gijutsu Kenkyu Hokoku, vol. 93, No. 384, pp. 25-30, Dec. 15, 1993.

Shinichi Ikeno et al.: "Gendai ango riron" The Institute of Electronics, Information and Communication Engineers, 3rd ed., pp. 223-225 May 20, 1989.

G. A. Spanos, et al., Computers and Communications, XP-010158347, pp. 72-78, "Security for Real-Time MPEG Compressed Video in Distributed Multimedia Applications", Mar. 27, 1996.

K. Nahrstedt, et al., Multimedia and Expo, XP-010512738, pp. 1275-1278, "Approaches to Multimedia and Security", Jul. 30, 2000.

* cited by examiner

WHEN Secure RTP IS USED

WHEN Secure RTP IS NOT USED

WHEN SSL / WTLS IS NOT USED

WHEN SSL / WTLS IS USED

DATA SECURING COMMUNICATION APPARATUS AND METHOD

TECHNICAL FIELD

The present invention relates to communication apparatus and method that provide data security against eavesdropping and falsification by encryption and authentication of the transmission data.

PRIOR ART

IP (Internet Protocol) networks, typified by the Internet, are not inherently equipped with security features. If no prevention measures are taken, it would be possible to eavesdrop and modify the contents of communication without arousing the notice of the parties concerned with the communication by the acquisition or alteration of the IP packet during transmission. Therefore, security protection is crucial for the transmission and reception of important information about business transactions or the like on the IP network.

For example, in content delivery services that deliver music and video through the Internet, the music and video data to be delivered are valuable important information and need to be protected against interception and falsification during transmission. And, in the VoIP system that offers telephone services through the IP network, it is necessary to prevent illegal eavesdropping of the contents of communication.

In the VoIP system and in a streaming content delivery system, RTP/UDP is commonly used as shown in FIG. 1A for the transmission of data required to be real-time. RTP (Real time Transport Protocol) is a protocol that is used in an application layer 11 and is suitable for real-time processing. UDP (User Datagram Protocol) is a connectionless protocol that is used in a transport layer 12 which is an interface between the application layer 11 and a network layer 13.

A transmission packet according to this system comprises, for example, as shown in FIG. 2, an IP header 13H, a UDP header 12H, an RTP header 11H and an RTP payload 11PL. Since RTP/UDP is intended for real-time packet transmission rather than for ensuring packet transmission like TCP (Transmission Control Protocol, a connection-type protocol that is used in the transport layer), there is a possibility of the occurrence of a packet loss during transmission. For this reason, measures against the packet loss should be taken into account on the occasion of studying the security scheme for application to RTP/UDP.

Further, it is also important to apply security techniques to mobile communications now quickly spreading. For RTP/UDP packet transmission in a mobile communication network, headers of both of the RTP packet (RTP header+RTP payload) and the UDP packet (UDP header+RTP packet) compressed in a radio link with a view to improving the utilization efficiency of the radio transmission band. Accordingly, it is to be wished that the security scheme, especially, the encryption system be one that allows header expansion/compression of the RTP/UDP packet in links halfway through transmission.

As a secure RTP packet transmission system for application to mobile communication networks, Secure RTP (SRTP, see: draft-ietf-avt-srtp-00. txt) has been proposed by IETF (Internet Engineering Task Force). In SRTP there have been introduced a selective encryption system that allows header compression and an encryption system that lessens the influence of the packet loss or bit error. That is, the RTP packet is processed, as depicted in FIG. 3, by encrypting only the RTP payload 11PL, and generating and adding a data authentication code (authenticator) 11A to the encrypted RTP payload 11PL and the RTP header 11H so that the validity of data of the RTP header 11H and the encrypted RTP payload 11PL can be verified. This technique permits efficient protection but RTP-specific.

That is, Secure RTP necessitates the use of an RTP-specific encryption algorithm and encryption parameter, and hence it cannot be utilized for applications and transport protocols on other UDP systems. Since its selective encryption parameter and encryption algorithm are fixed, Secure RTP cannot deal with new protocols and hence it is not suited to content delivery that makes rapid progress. A security technique specialized for a particular application, as mentioned above, is not preferable since it is necessary to study an individual security technique each time a new application is developed. Further, although the security technique is not permanent, Secure RTP has its encryption algorithm fixed and hence raises a problem in terms of security.

On the other hand, SSL (Secure Socket Layer) (TSL) is now widely used as a security technique on the Internet. When SSL (TSL) is not used, applications in layer 11, such as HTTP (Hypertext transfer Protocol), FTP (File Transfer protocol) and Telnet (remote log-in), are connected directly to a TCP or UDP transport layer 12 as shown in FIG. 4A. In contrast thereto, SSL is a security protocol that is located between the TCP or UDP transport layer 12 and the application layer 11 as depicted in FIG. 4B. SSL provides a secure data transmission service to the application layer by performing some security processing of data that is sent and received through utilization of the data transmission function offered by TCP or UDP. Therefore, there is no limitation to application and encryption algorithm to be utilized. SSL is in wide use particularly for an HTTP session in a Web access, but it can also be used versatily for other applications of FTP and Telnet. Moreover, there is proposed, as a modified version of SSL for mobile communication use, WTLS (Wireless Transport Level Security) standardized in the WAP (Wireless Application Protocol) Forum.

SSL and WTLS generally have a two-layer configuration as depicted in FIG. 5. The protocol that is used in the lower layer 11S2 in the two-layer configuration is called Record Protocol, and it offers facilities for encrypting protocol data of the upper layer 11S1 and adding a data authentication code (MAC). The upper layer 11S1 in the two-layered configuration of SSL contains four kinds of protocols, a handshake protocol HSP (Handshake Protocol), an alert protocol ALP (Alert Protocol), a change cipher protocol CCP (Change cipher Protocol) and an application data protocol ADP (Application Data Protocol). The handshake protocol HSP possesses negotiation facility of an encryption/data authentication scheme and terminal/server authentication; the alert protocol ALP possesses an event and error indicating facility; and the change cipher protocol CCP possesses a facility of validating an negotiated encryption/authentication scheme. The application data protocol for indicating the start of encrypted communication to the other party is to transparently send and receive upper-layer application data; HTTP or FTP data in the application layer 11 is provided via this protocol to the record protocol (Record Protocol) 11S2.

FIG. 6 shows an example of the data configuration that is sent and received between record protocols (Record Protocols) of the sending and received sides. In a header 20H there are contained an identifier (Protocol type) 21 indicating the kinds of upper-layer protocols (such as handshake, alert and application data), an SSL version (Major Version, Minor Version) 22, and data lengths (Length (high), Length (low)) 23A and 23B. A payload 24 is encrypted upper-layer protocol data; the encrypted data 24 contains a data content (Content) 24A and an authenticator MAC 24B for verifying the validity of the data content and the header. This configuration is applied to all protocols that utilize the record protocol 11S2, including the application data protocol. Accordingly, in the case of transmitting the RTP packet by use of SSL, the header and the payload in their entirety are encrypted and mapped into the payload 24 of the record protocol data.

When the header of the record protocol is added to such an encrypted version of the whole RTP packet or the RTP packet, it is impossible to perform RTP header compression during transmission. That is, since the header compression is performed collectively for the RTP header, the UDP header and the IP header arranged one after another as depicted in FIG. 2, if a record protocol header 20H is inserted between the RTP header and the UDP header, they cannot collectively be data-compressed. For this reason, the application of SSL/WTSL to the RTP packet protection is not desirable in mobile communications.

In common data communications, too, it would be convenient if only a particular portion desired to protect could be secured by encryption or authentication for verification of its validity, but it has been difficult to adaptively provide security.

An object of the present invention is to provide a data-securing communication apparatus and method that permit communication with only part of input data selectively secured.

DISCLOSURE OF THE INVENTION

According to the present invention, the communication apparatus at the sending side shares parameters indicating a securing target of input data with a data-securing communication apparatus at the receiving side via a communication channel, and selectively secures part of the input data according to the shared parameter, thereafter outputting the data.

BEST MODE FOR CARRYING OUT THE INVENTION

First Embodiment

Figure 7:
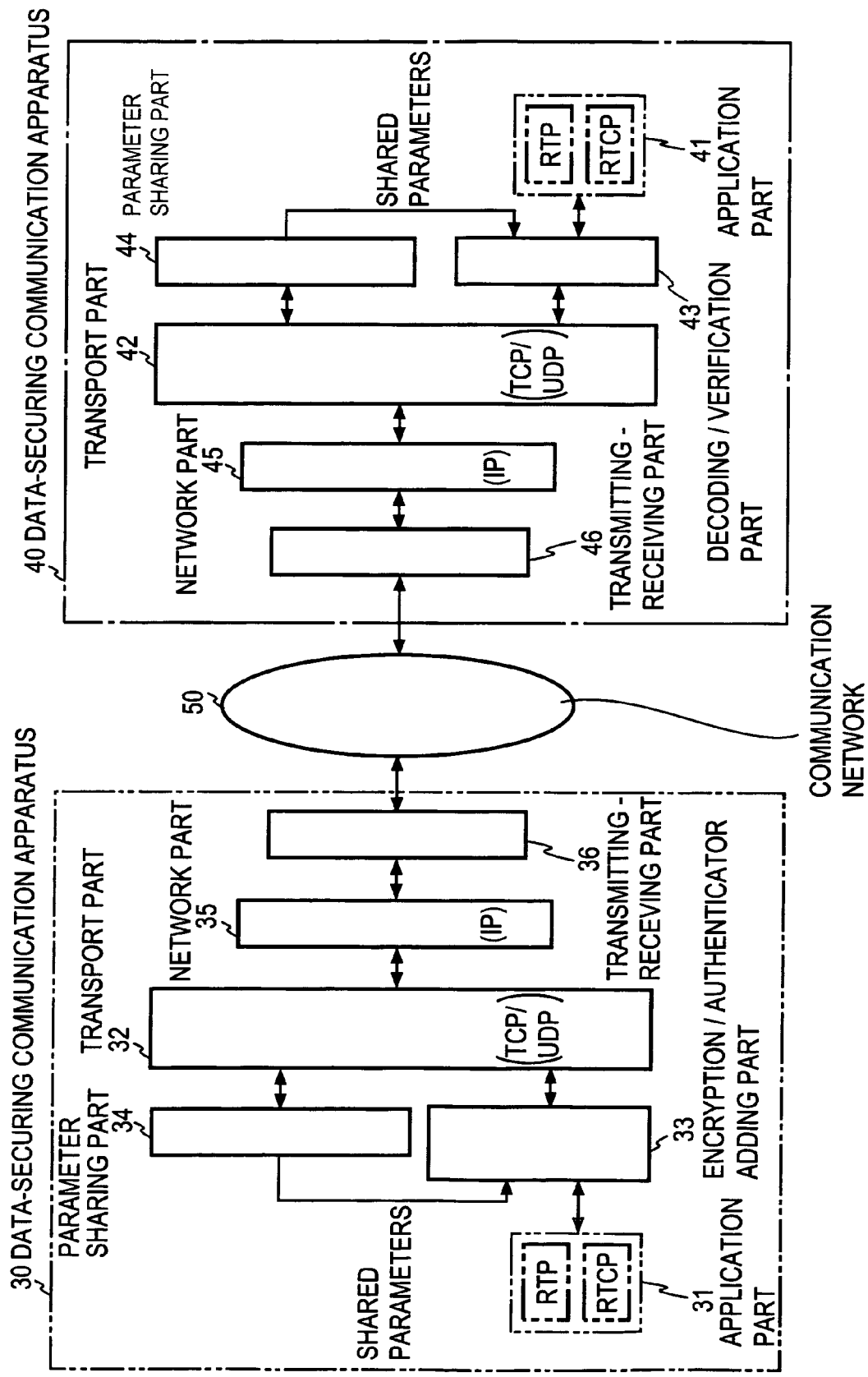
FIG. 7 is a diagram illustrating the functional configuration of an embodiment of this invention apparatus and an example of the system configuration in which this invention apparatus is used.

FIG. 7 illustrates a first embodiment of the present invention and the general outline of a data transmission system using the embodiment.

A data-securing communication apparatus 30 of the present invention, for example, at such a transmitting side as a server or data terminal and a data-securing communication apparatus 40 of the present invention similarly at such a receiving side as a server or data terminal can be connected via a communication network 50. The communication network 50 is shown as one network, but it may also be formed by plural networks such as a combination of a public communication network and the Internet.

The data-securing communication apparatus 30 in this embodiment has, as securing means, an encryption/authenticator adding part 33 between an application part 31 and a transport part 32. And, a parameter sharing part 34 is provided as an upper layer of the transport part 32. The transport part 32 has a TCP or UDP function and is connected, for example, to a network part 35 equipped with an IP function, and the network part 35 is connected to a transmitting-receiving part 36 that is a physical layer, and the transmitting-receiving part 36 is connected to the communication network 50.

The data-securing communication apparatus 40 is substantially identical in configuration with the data-securing communication apparatus 30; that is, it is provided with an application part 41, a transport part 42, a network part 45 and a transmitting-receiving part 46, and in this embodiment, a decoding/verification part 43 is provide as securing means, and a parameter sharing part 44 is provides as an upper layer of the transport part 42.

Prior to the transmission of application data from the application part 31, the communication apparatus 30 negotiates with the counterpart apparatus 40 about parameters necessary for data security, that is, parameters necessary for encryption processing/data authenticator (code) generation processing, and shares these parameters with the counter part apparatus 40. The parameters are: information for specifying which of algorithms Null, DES, 3DES, RC4 and so on is used; secret information for key generation; random values for encryption/decryption or authentication/verification in the communication apparatus 30 (for example, a server apparatus) and the communication apparatus 40 (for example, a client apparatus); the range over which to encrypt transmission data; and the range of data authentication.

In this embodiment it is particularly important that the parameters for specifying the range of encryption and the range of data authentication are newly provided as shared parameters, and the other parameters are shared in the same way as that for shared parameters used in securing protocols by conventional SSL (TSL) scheme; sharing of these parameters is performed by intercommunication between the communication apparatuses 30 and 40 via the communication channel as is the case with conventional SSL scheme.

In this case, the newly shared parameters which indicate the securing target of data to be transmitted—the range of encryption and the range of data authentication in this example—are information for determining the range over which it encrypt and authenticate the input data packet (data packet from the application part 31 in this example), and various methods are possible for specifying the range; for example, information "start encryption at such and such a byte from the beginning of the packet" is used to specify the range.

Further, the range of encryption and the range of data authentication are determined according to the kind of input data, that is, the application in this example, or according to the transmission characteristics (such as the transmission rate, delay characteristic, transmission error characteristic, attenuation characteristic, frequency characteristic and distortion characteristic) of the communication network 50 to which the communication apparatus 30 is connected.

Figure 9:
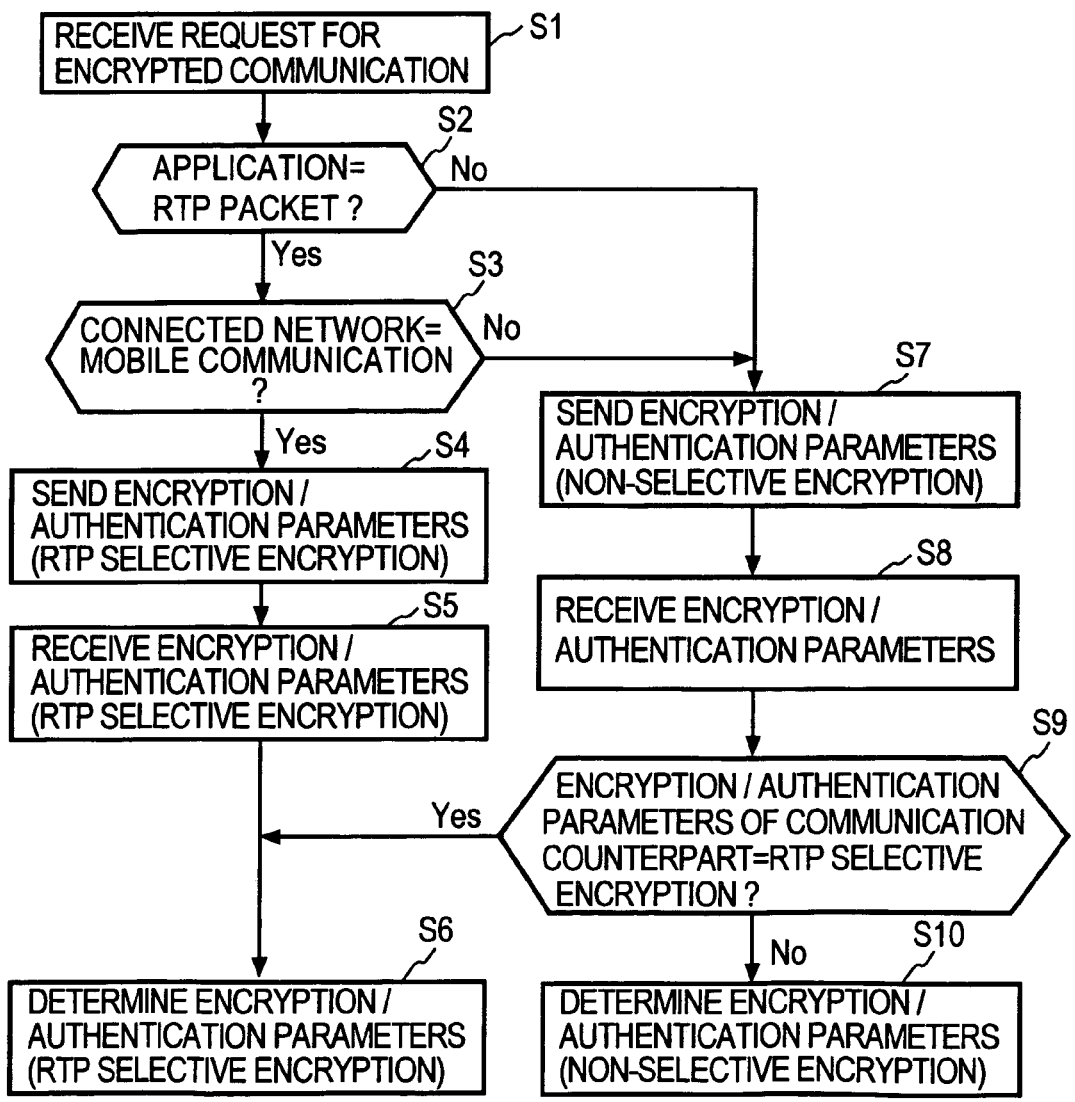
FIG. 9 is a flowchart showing an example of an encryption range sharing procedure at the transmitting side.

The parameter sharing part 34 of the communication apparatus 30 determines sharing of the parameters indicative of the securing target, for example, by the procedure shown in FIG. 9. On receiving a request for encrypted communication (S1), the parameter sharing part: makes a check to see if the input data application packet is an RTP packet (S2); if it is an RTP packet, makes a check to see if the communication network 50 to which the apparatus 30 is connected is a network of low transmission rate, for example, a mobile communication network (S3); and if it is a mobile communication network, transmits to the other communication apparatus 40 encryption/authentication parameters indicating selective encryption of the RTP packet (indicating, for example, that the RTP header at the beginning of the input data is excluded from encryption) (S4). At this time, other parameters, such as the encryption algorithm and the data authenticator generation algorithm, are also sent.

Figure 10:
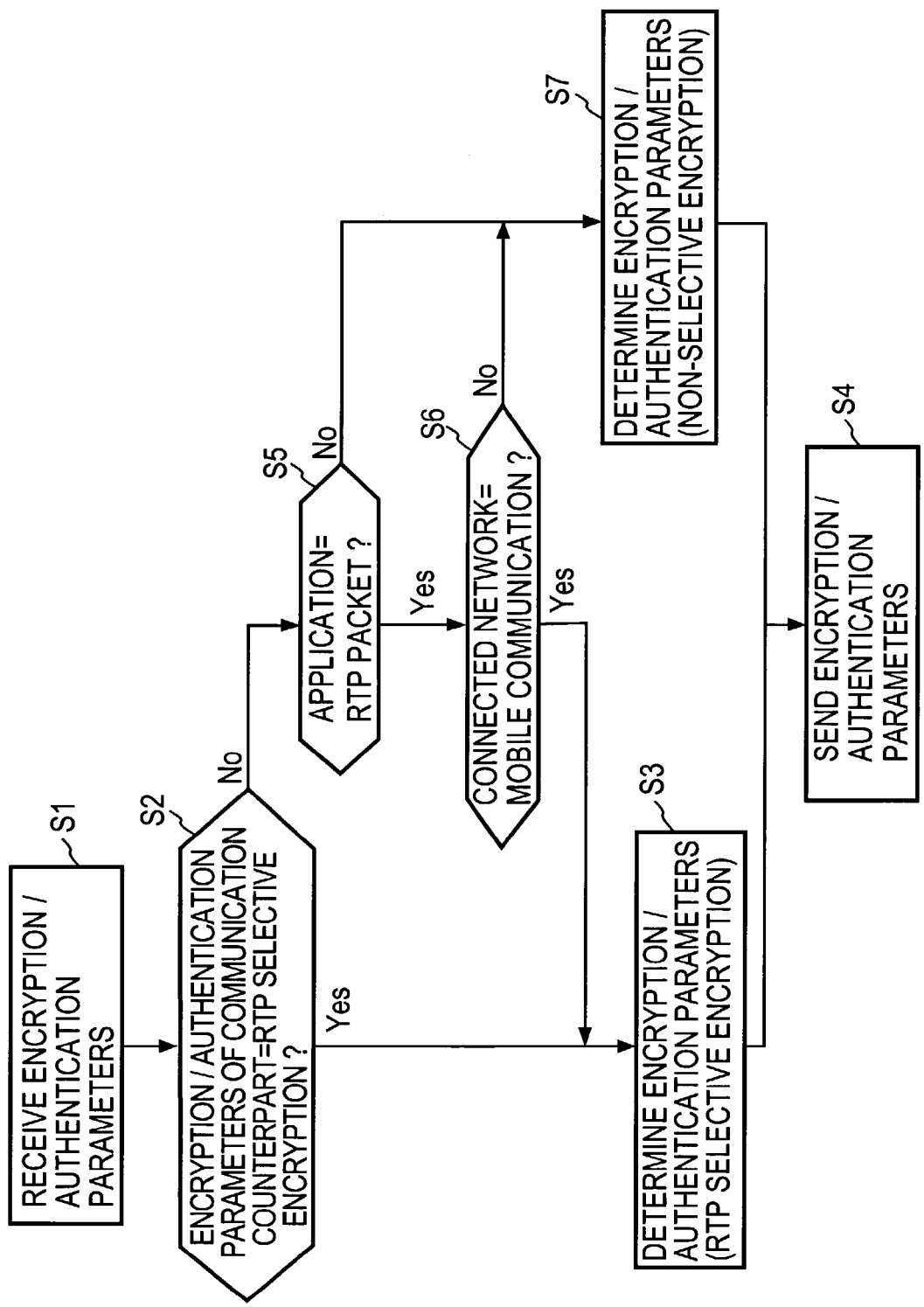
FIG. 10 is a flowchart showing an example of an encryption range sharing procedure at the receiving side.

On the other hand, upon receiving the encryption/authentication parameters from the communication apparatus 30 (S1) as shown, for example, in FIG. 10, the parameter sharing part 44 of the communication apparatus 40: makes a check to see if the received encryption/authentication parameters are those for selective encryption of the RTP packet (S2); if so, determines that the encryption/authentication parameters in the parameter sharing part 44 are those for RTP packet selective encryption (S3); and sends the determined encryption/authentication parameters to the communication apparatus 30 (S4).

On receiving from the communication apparatus 40 the encryption/authentication parameters indicating RTP packet selective encryption (S5) as shown in FIG. 9, the parameter sharing part 34 of the communication apparatus 30 determines the encryption/authentication parameters as the target of RTP packet selective encryption (S6). In this way, the both parameter sharing parts 34 and 44 share the RTP selective encryption as the encryption/authentication parameters via the communication channel. Incidentally, the encryption algorithm and other parameters are similarly determined at the same time. In this instance, as is the case with conventional SSL, for instance, several candidates for each parameter are sent to the apparatus 40 for determination.

In FIG. 9, when it is decided in step S2 that the input data is not an RTP packet, or when it is decided in step S3 that the transmission rate of the communication network 50, to which the communication apparatus 30 is connected, is high, the communication apparatus sends to the counterpart 40 encryption/authentication parameters indicating encryption of the whole input data (packet), that is, indicating non-selective encryption (S7).

As depicted in FIG. 10, when it is decided in step S2 that the encryption/authentication parameters are not for RTP packet selective encryption, the parameter sharing part 44 of the communication apparatus 40: decides whether the input data (application) from the application part 41 of the communication apparatus 40 is an RTP packet (S5); if it is an RTP packet, makes a check to see if the communication network 50 to which the communication apparatus 40 is connected is, for example, a mobile communication network of low transmission rate (S6); and if so, goes to step S3, in which it determines the encryption/authentication parameters indicating RTP packet selective encryption and sends it to the communication apparatus 30 (S4). When it is decided in step S5 that the input data is not an RTP packet, or when it is decided in step S6 that the communication network 50 is not a mobile communication network whose transmission rate is not low, the parameter sharing part determines encryption/authentication parameters indicating non-selective encryption (S7), and sends the parameters to the communication apparatus 30 (S4).

As depicted in FIG. 9, upon receiving the encryption/authentication parameters from the communication apparatus 40 (S8) after the transmission in step S7, the parameter sharing part 34 of the communication apparatus 30: makes a check to see if the received encryption/authentication parameters are those for RTP packet selective encryption (S9); if so, goes to step S6, in which the parameter sharing part determines the encryption/authentication parameters as those for RTP packet selective encryption; and if not for RTP packet selective encryption, determines the encryption/authentication parameters as those for non-selective encryption (S10).

In this way, the parameter sharing parts 34 and 44 can share the range of encryption via the communication channel. The range of authentication is set to be the whole input data irrespective of the input data (application) and independently of the transmission characteristic of the communication network 50 to which the communication apparatuses 30 and 40 are connected. The range of encryption can be specified not only as to whether to exclude the header from encryption but also as desired. For example, when the input data is image or audio data, it is also possible to limit the range of encryption specifically to an important portion which, if lost, would make decoding impossible. In either case, the encryption algorithm and other parameters are also subjected to sharing processing simultaneously with sharing of the range of encryption.

When the parameters are shared as described above, they are provided to the encryption/authenticator adding part 33 and the decoding/verification part 43 from the parameter sharing parts 34 and 44, respectively.

Figure 11:
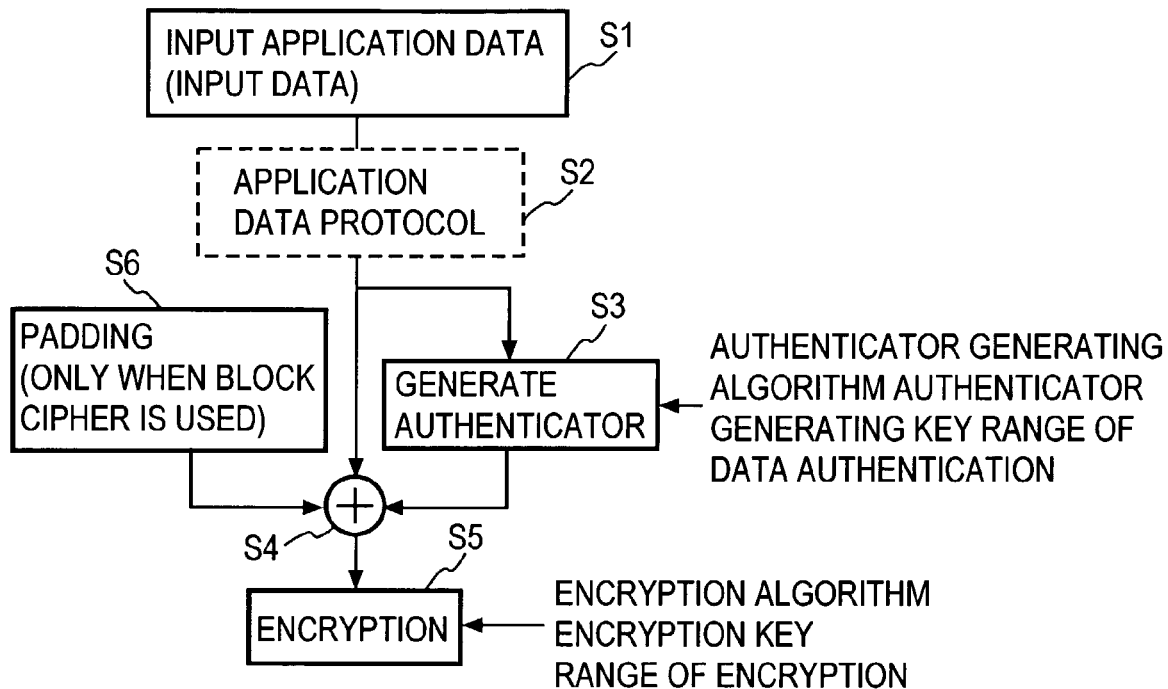
FIG. 11 is a flowchart showing an example of the procedure of an encryption/authenticator adding part 33 in FIG. 7.

The encryption/authenticator adding part 33 performs encryption/authenticator adding processing. An example of the procedure therefor is shown in FIG. 11. When input from the upper application part 31 (S1), a data packet is transparently input to the encryption/authenticator adding part 33 by an application data protocol (S2), and an authenticator is generated by a shared authenticator generating algorithm/authenticator generating key by use of that portion of the data packet selected according to the authentication range parameter (S3). The authenticator generating method is described in detail, for example, in IMAI Hideki, "Lecture on Cryptography," Section 4.7. The authenticator is generated, for instance, by compressing the authentication range data by a hash function and encrypting the compressed data by the common key. Then the authenticator is added to the input data packet (S4), and that port of the authenticator-added data packet which is selected based on the encryption range parameter is encrypted using the shared encryption algorithm and encryption key (S5). Incidentally, in the case of block encryption, padding is carried out prior to the encryption in anticipation of the shortage of data for the fixed block length (S6).

Figure 12:
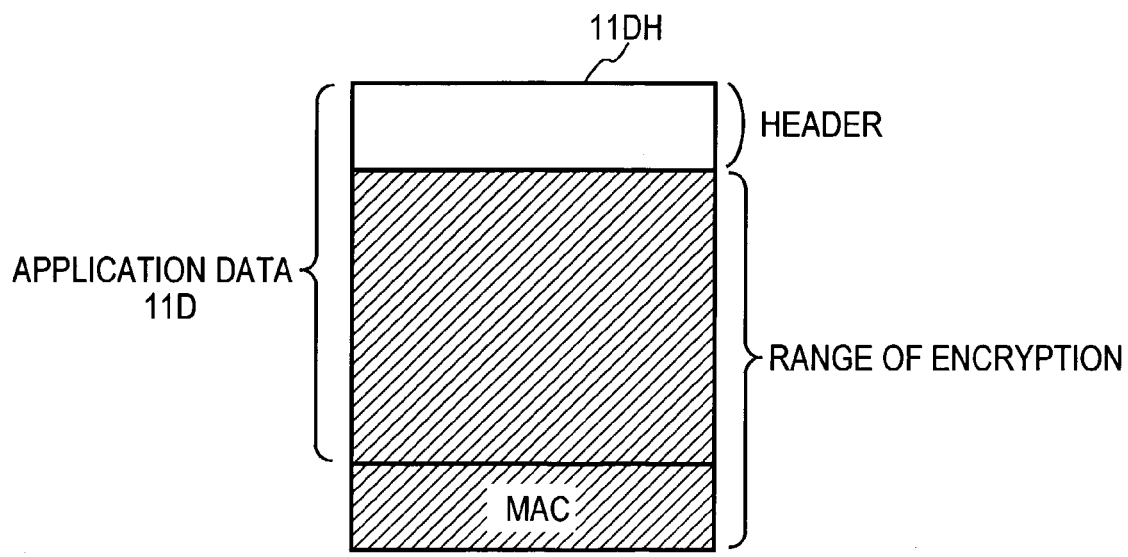
FIG. 12 is a diagram depicting an example of the data configuration of the output packet from the encryption/authenticator adding part 33.

In FIG. 12 there is shown an example of the configuration of such encrypted data. In this example the authenticator MAC is added to the input application data 11D, and the portion (payload) of the application data, except the header 11DH, and the authenticator MAC are encrypted. The selectively encrypted data is provided to the lower transport part 32, from which it is sent to the other communication apparatus 40.

The receiving-side communication apparatus 40 decodes the encrypted data following the procedure reverse to that described above, and the validity of the received data is verified by use of the data authenticator (code). That is, in the communication apparatus 40 in FIG. 7, the packet received from the communication apparatus 30 is input from the transport part 42 to the decoding/verification part 43, and in the decoding/verification part 43 the encrypted portion is selectively decoded according to the shared encryption algorithm, encryption key and range of encryption, and the data authenticator (code) MAC in the decoded data is used to verify the validity of the header and the decoded payload, that is, the application data in FIG. 12. The application data, if valid, is supplied to the application part 41.

By such sharing of the range of encryption, it is possible to selectively encrypt part of the input data; for example, encryption of only that portion of the input data whose security becomes an issue makes the workload lighter than in the case of encrypting the whole input data, and settles the security issue. The range of encryption can be shared simultaneously with sharing of the other parameters for encryption, and an increase in the workload therefor is very slight.

In particular, when the input data (application)is an RTP packet as mentioned above, if the header portion of the RTP packet is not encrypted, a UDP packet header and an IP packet header are added to the above header—this provides for header compression, including the RTP packet, during transmission as is the case with Secure RTP. Further, since the area of encryption can be set at the beginning of the session through negotiations with the receiving side unlike in the case of Secure RTP, this scheme can also be applied versatily to other applications than the RTP packet.

Figure 13:
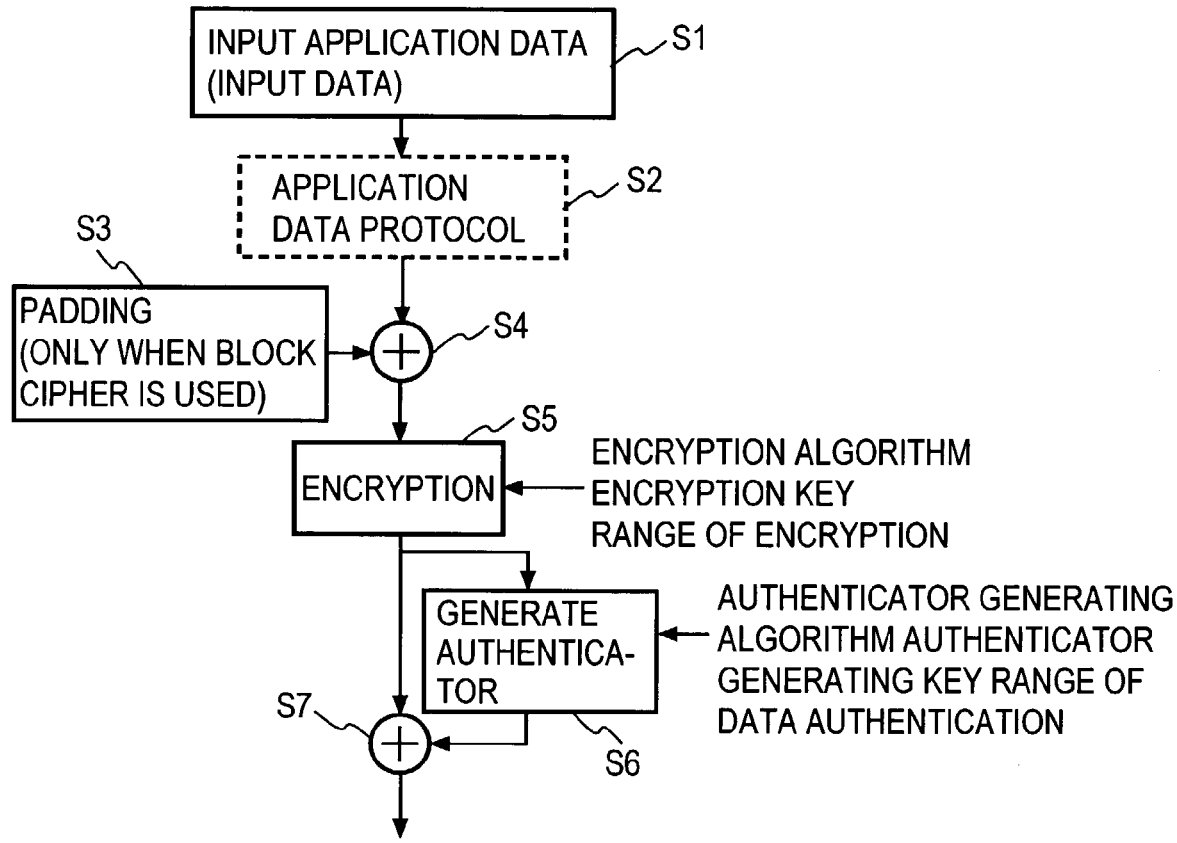
FIG. 13 is a flowchart showing another example of the procedure of the encryption/authenticator adding part 33.

Although in FIG. 11 the addition of the authenticator is followed by encryption, it is also possible to generate the authenticator after encryption (S5) and add the authenticator to the encrypted packet (S7) as depicted in FIG. 13. In this case, at the receiving side the verification of the validity of the received data is followed by decoding. When padding (S3) is necessary, it precedes encryption (S5).

Figure 14:
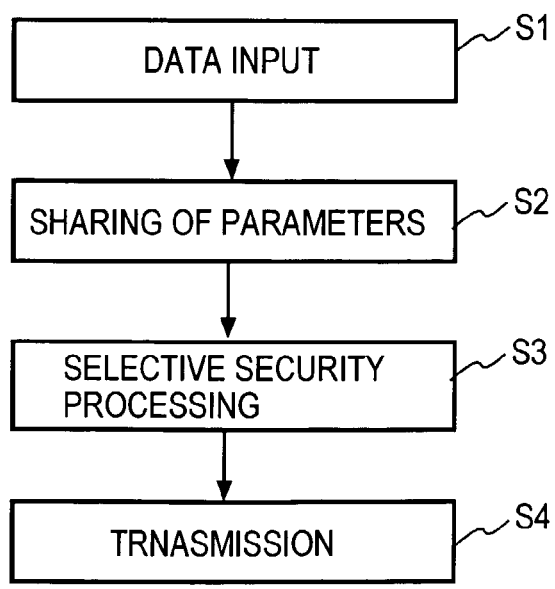
FIG. 14 is a flowchart showing an example of procedure of this invention method.

The flow of the above-described selective security processing is shown in FIG. 14, in which, upon input thereto of data (S1), the transmitting-side communication apparatus: shares parameters indicative of the securing target of the input data with the receiving-side communication apparatus via the communication channel (S2); perform security processing of part of the input data based on the shared securing target parameters (S3); and transmits the input data (S4).

Second Embodiment

Figure 1A:
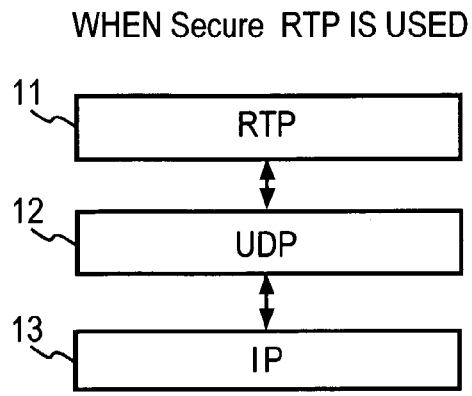
FIG. 1A is a diagram showing processing that does not use Secure RTP.
Figure 1B:
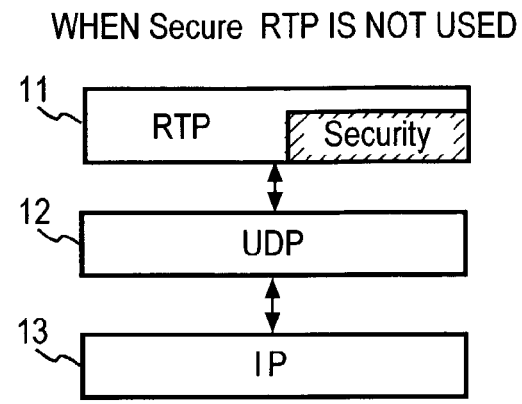
FIG. 1B is a diagram showing processing that uses Secure RTP.
Figure 2:
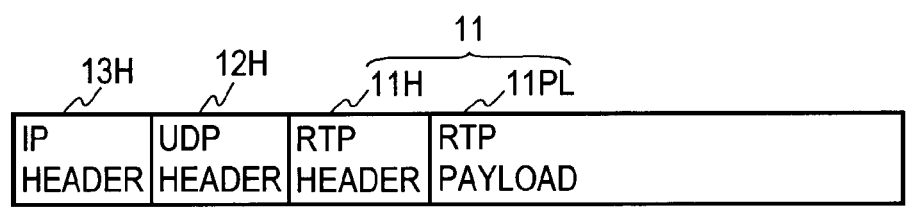
FIG. 2 is a diagram depicting an example of packet configuration.
Figure 3:
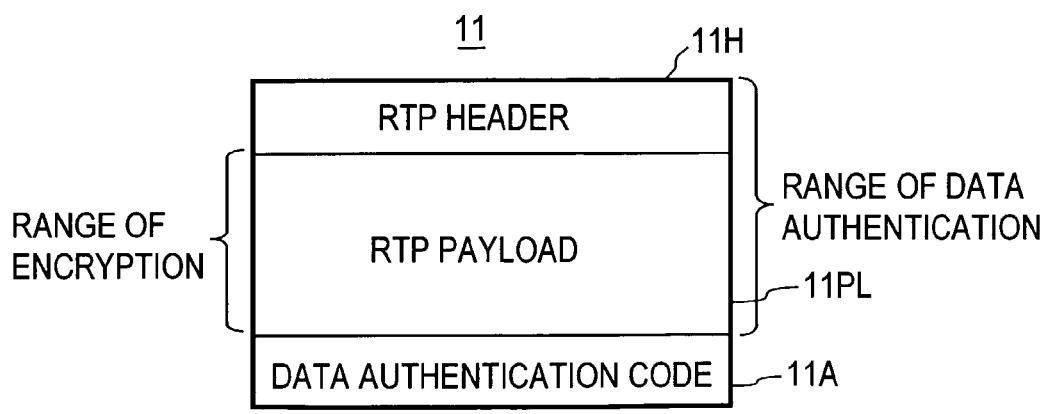
FIG. 3 is a diagram depicting data configuration of a selectively encrypted packet.
Figure 4A:
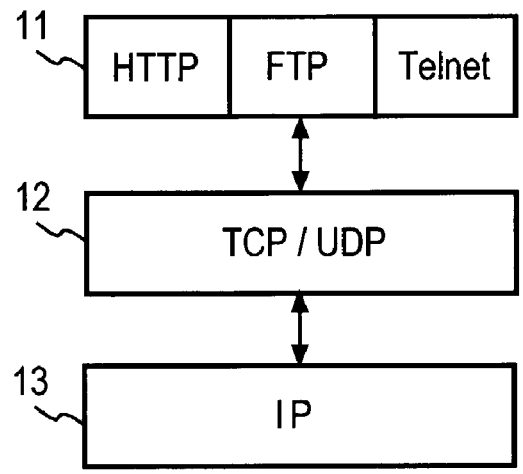
FIG. 4A is a diagram showing application data processing that does not use SSL/WTLS.
Figure 4B:
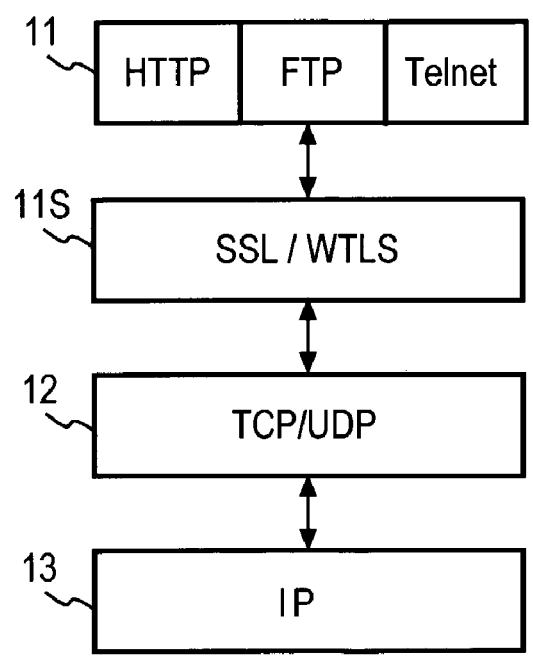
FIG. 4B is a diagram showing application data processing that uses SSL/WTLS.
Figure 5:
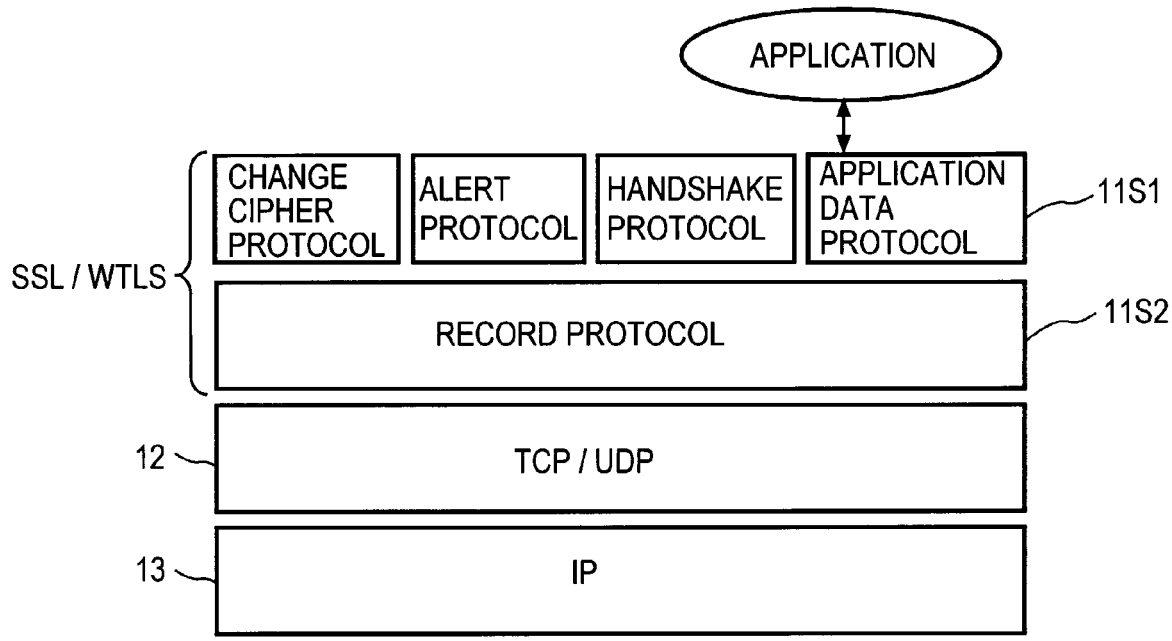
FIG. 5 is a diagram showing particulars of the SSL/WTLS layer.
Figure 15:
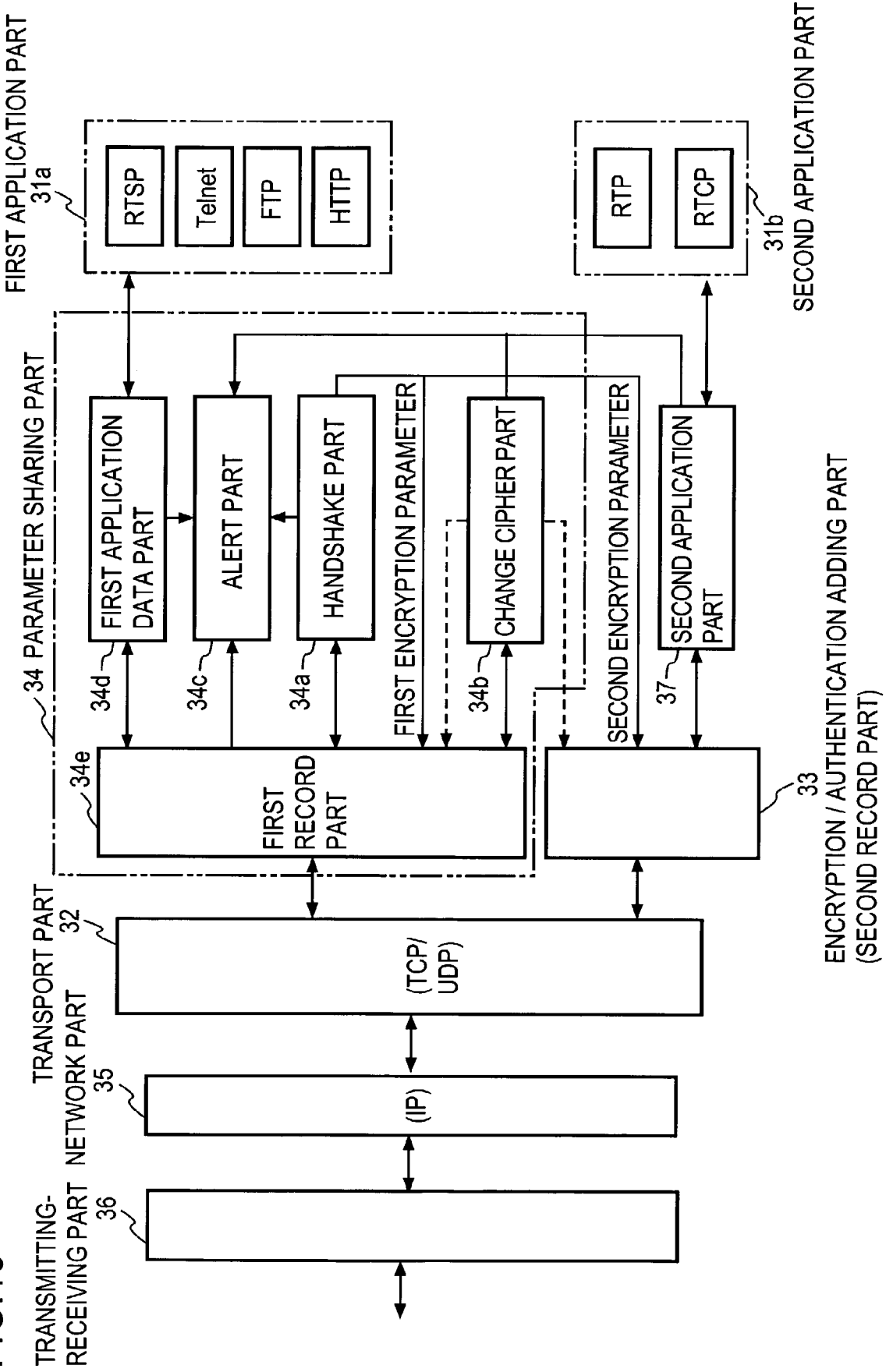
FIG. 15 is a diagram illustrating the functional configuration of a second embodiment of this invention apparatus.

FIG. 15 illustrates a second embodiment of the present invention. This embodiment is adapted to be capable of supporting the selective encryption by extending the SSL scheme depicted in FIG. 5. The parameter sharing part 34 in the first embodiment further comprises: a handshake (Handshake) part 34a for negotiating with the receiving-side communication apparatus 40 about authentication processing and encryption/data authentication parameters; a change cipher (Change Cipher) part 34b for validating the encryption/data authentication parameters; an alert (Alert) part 34c for indicating an event error; a first application data part 34d for transparently sending and receiving upper-layer application data; and a first record (Record) part 34e for sending and receiving protocols of the above-mentioned four parts 34a, 34b, 34c and 34d via the lower layer part (transport part) 32.

Figure 6:
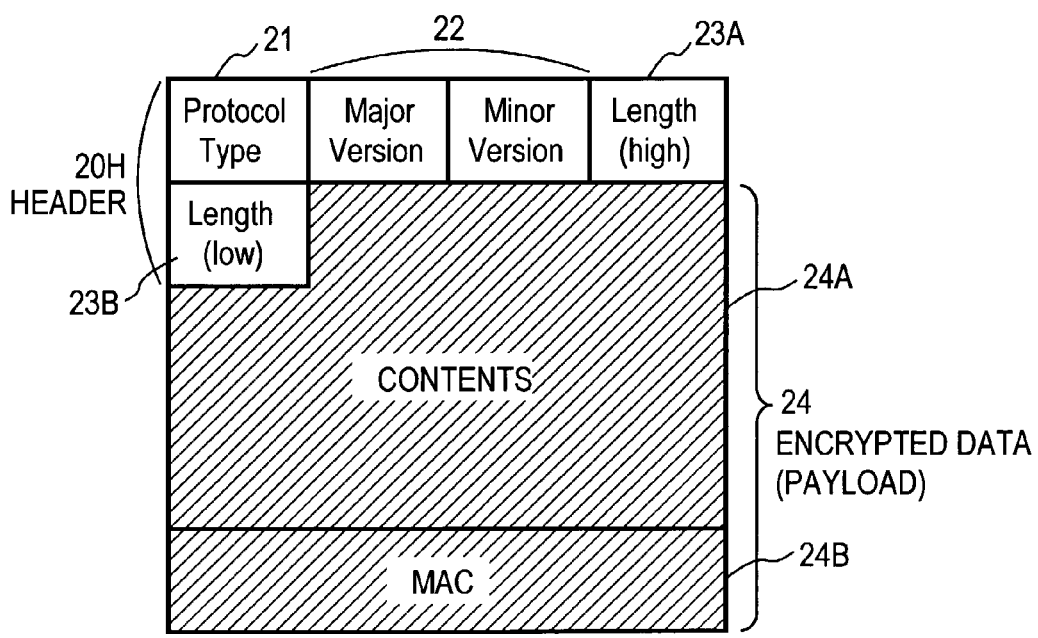
FIG. 6 is a diagram showing the configuration of record protocol data processing by SSL/WTLS.

The first record part 34e uses, as its protocol data format, the same format as that of the SSL record part shown in FIG. 6. The handshake part 34a negotiates with the receiving-side communication apparatus 40 about the encryption/data authentication parameters that are used in the first record part 34b and the second record part (encryption/authenticator adding part) 33. And the change cipher (Change Cipher) part 34b validates the encryption/data authentication parameters of the first record part 34e and the second record part 33. That is, it starts and indicates encryption to the receiving side. To the first record application data part 34e are input a protocol message of the handshake part 34a and application data that does not necessitate the selective encryption in the first application data part 34d.

The transmission and reception of application data that necessitates selective encryption are performed, independently of the above-mentioned protocol data, by a second record part, that is, by the encryption/authenticator adding part 33. A second application data 37 is to transparently send and receive the data packet of a high-order second application part 31b to and from the second record part 33. Further, unlike the first record part 34e the second record part, that is, the encryption/authenticator adding part 33 does not add a new header to the input data but performs the encryption/authenticator generation processing alone. The parameters shared by the first record part 34e are used for the encryption/data authentication processing in the second record part 33. The encryption/data authentication processing is the same as in the first embodiment.

The handshake part 34a starts the parameter sharing procedure using plaintext communication with the receiving-side communication apparatus 40, and may protect the communication using shared encryption/authentication parameters halfway through the procedure among applications an application data packet which is not required to have the real time property and is not frequently sent, such as HTTP, FTP, Telnet or RTSP (a protocol for opening the RTP session), is input from a first application part 31a via the first application data part 34d to the first record part 34e, which encrypts the input packet in its entirety based on the shared parameters and adds the encrypted packet with the header 20H of the record part as depicted in FIG. 6, thereafter providing the packet as a record protocol packet to the transport part 32. Incidentally, the receiving-side communication apparatus 40 has the same construction as depicted in FIG. 15 except that the encryption/authenticator adding part 33, which is the second record part, is a decoding/verification part.

Third Embodiment

Figure 8:
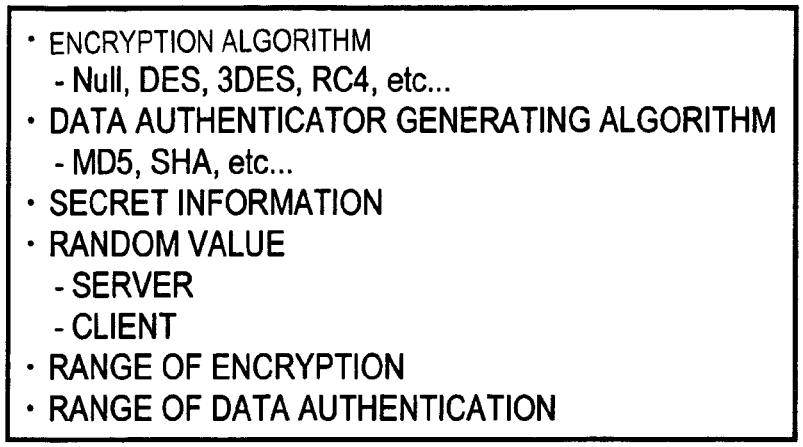
FIG. 8 is a diagram showing examples of encryption parameters.
Figure 16:
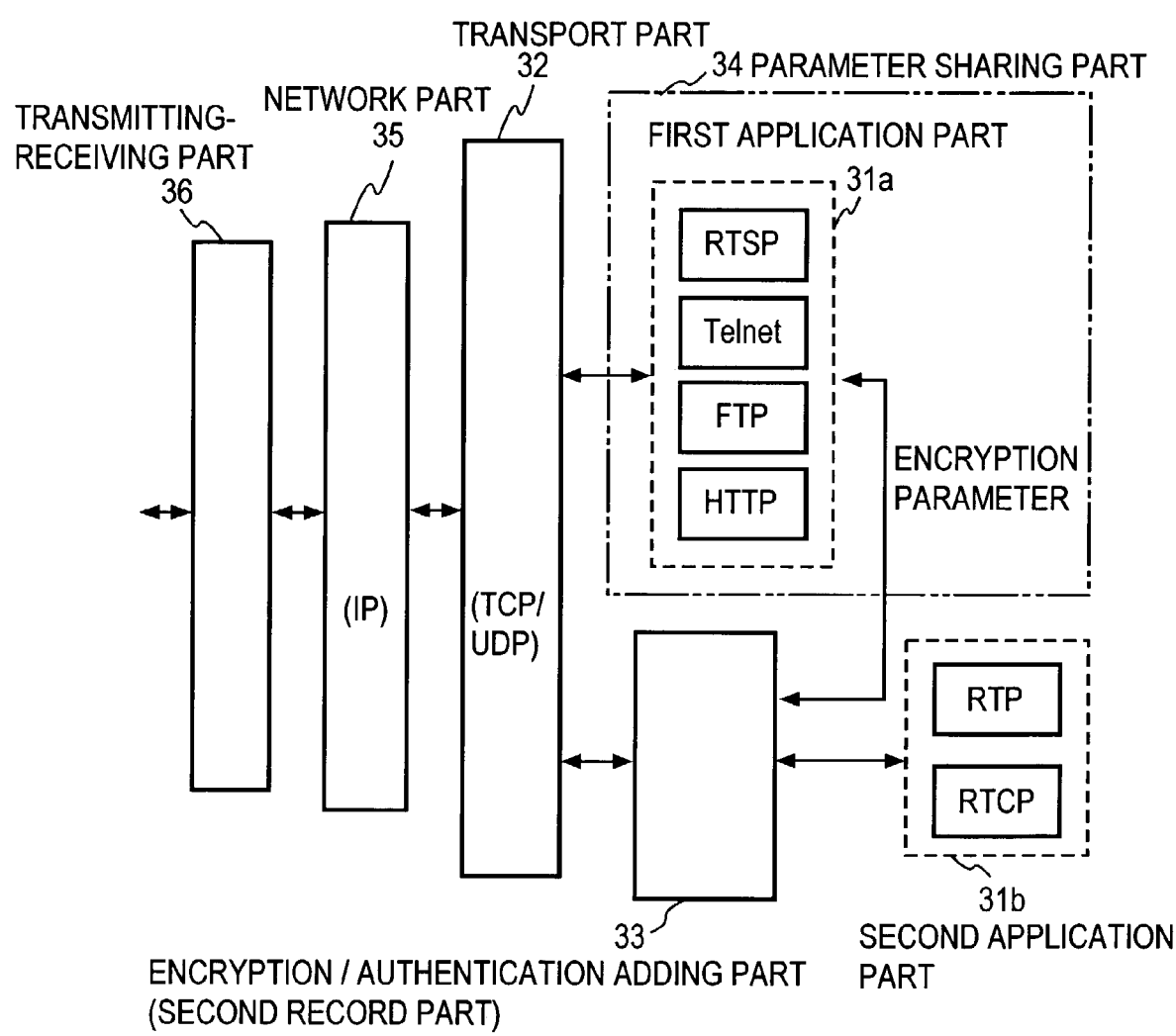
FIG. 16 is a diagram illustrating the functional configuration of a third embodiment of this invention apparatus.

FIG. 16 illustrates a third embodiment of the present invention. This embodiment negotiates with the receiving-side via the first application part 31a as of RTSP or HTTP to share the encryption/authenticator adding parameter that are applied to the application data of the second application part 31b. For example, encryption parameters in FIG. 8 can be transmitted to the receiving-side apparatus 40 by encrypting them by the public key of the receiving-side communication apparatus 40 and embedding the encrypted parameters in the protocol message body.

It is also possible to provide both of the encryption/authenticator adding part and the decoding/verification part in one communication apparatus. While the above embodiment performs, for data security, both of encryption and data authenticator addition, only one of them may also be utilized. The respective parts of the communication apparatuses 30 and 40 may be implemented by executing programs on a computer.

EFFECT OF THE INVENTION

As described above, the present invention provides security for a selected portion of data, permits versatile transmission data protection unspecific to a particular application, and enables header compression when employed in mobile communications in particular.

What is claimed is:

1. A data-securing communication apparatus comprising:
an application part for generating an application data to be transmitted;
parameter sharing means for sharing parameters for securing input data including said application data with a receiving-side data-securing communication apparatus via a communication channel;
securing means for securing said input data based on said shared parameters;
sending means for sending the output of said securing means through said communication channel in a predetermined form; and
wherein said parameter sharing means negotiates and shares, with the receiving-side data-securing communication apparatus, parameters indicative of a portion of said input data to be secured and said securing means is adapted to selectively secure the portion of said input data based on said shared parameters.

2. The data-securing communication apparatus as claimed in claim 1, which is further provided with means for determining said portion of input data in accordance with the kind of said application data.

3. The data-securing communication apparatus as claimed in claim 1, which is further provided with means for determining said portion of input data in accordance with the network to which said apparatus is connected.

4. The data-securing communication apparatus as claimed in claim 1, wherein said portion of input data is a portion for encryption, said receiving-side communication apparatus being a decrypting apparatus and said securing means being encryption means.

5. The data-securing communication apparatus as claimed in claim 4, wherein said input data is an RTP packet and said portion for encryption is data except an RTP header.

6. The data-securing communication apparatus as claimed in claim 4, wherein the criterion for determining said portion for encryption is the transmission rate of the communication channel of said network.

7. The data-securing communication apparatus as claimed in claim 1, wherein: said portion of input data is a portion for authentication of said input data; said receiving-side data-securing communication apparatus is a data verification apparatus; said securing means is means for calculating an authenticator from said portion for authentication of said input data; and means for outputting the input data after adding thereto said authenticator.

8. A data-securing communication apparatus comprising:
receiving means for receiving data through a communication channel;
parameter sharing means for sharing parameters for securing data with a transmitting-side data-securing communication apparatus via a communication channel; and
means for decoding and/or verifying said received data based on said shared parameters;
wherein said parameter sharing means negotiates and shares, with said transmitting-side data-securing communication apparatus, parameters indicative of a portion of said received data to be secured, and said means for decoding and/or verifying is adapted to selectively decode and/or verify the portion of the received data based on the shared parameters.

9. A data-securing communication method comprising:
(a) generating application data to be transmitted at a transmitting side;
(b) sharing parameters for securing input data including said application data with a receiving side via a communication channel; and
(c) securing said input data based on said shared parameters; and
(d) sending out said secured data through said communication channel to the receiving side:
in the receiving side;
(e) receiving data through said communication channel;
(f) sharing parameters for securing data with the transmitting side via the communication channel; and
(g) decoding and/or verifying the received data based on said shared parameters; wherein
said sharing step (b) includes step for negotiating and sharing, with the receiving side, parameters indicative of a portion of said input data to be secured;
said securing step (c) includes step for selectively securing the portion of input data based on said shared parameters;
(h) said step (f) includes a step of negotiating and sharing, with said transmitting side, the parameters indicative of the portion of data, and said step (g) is a step for selectively decoding and/or verifying the portion of the received data based on said shared parameters.

10. The data-securing communication apparatus as claimed in claim 2, which is further provided with means for determining said securing target in accordance with the network to which said apparatus is connected.

11. The data-securing communication method of claim 9, wherein said portion of said input data is a portion for authentication, and said securing step (c) is a step for:

calculating an authenticator from said portion of said input data and said step (d) is a step for outputting said input data after adding thereto said authenticator.

12. The data-securing communication apparatus as claimed in claim 2, wherein said securing target is a target for encryption, said receiving-side communication apparatus being a decoding apparatus and said securing means being encryption means.

13. The method as claimed in claim 12, wherein said received data is an RTP packet and said selective decoding is performed for data except an RTP header of said RTP packet.

14. The data-securing communication method as claimed in claim 10, wherein said input data is an RTP packet and the selective encryption is performed for data except an RTP header of said RTP packet.

15. The method of claim 12, wherein said received data contain authenticator and said portion is a portion for authentication, and said step (c) is a step for:

verifying the validity of data contained in said portion for authentication of the received data by data of said portion and said authenticator contained in said received data according to said parameters.

16. The data-securing communication apparatus as claimed in claim 3, wherein said securing target is a target for encryption, said receiving-side communication apparatus being a decoding apparatus and said securing means being encryption means.

17. The data-securing communication apparatus as claimed in claim 10, wherein said securing target is a target for encryption, said receiving-side communication apparatus being a decoding apparatus and said securing means being encryption means.

18. The data-securing communication apparatus as claimed in claim 2, wherein: said securing target is the range of authentication of said input data; said receiving-side data-securing communication apparatus is a data verification apparatus; said securing means is means for calculating an authenticator from said range of authentication of said input data; and means for outputting the input data after adding thereto said authenticator.

19. The data-securing communication apparatus as claimed in claim 3, wherein: said securing target is the range of authentication of said input data; said receiving-side data-securing communication apparatus is a data verification apparatus; said securing means is means for calculating an authenticator from said range of authentication of said input data; and means for outputting the input data after adding thereto said authenticator.

20. The data-securing communication apparatus as claimed in claim 10, wherein said securing target is the range of authentication of said input data; said receiving-side data-securing communication apparatus is a data verification apparatus; said securing means is means for calculating an authenticator from said range of authentication of said input data; and means for outputting the input data after adding thereto said authenticator.

21. The data-securing communication method of claim 9, wherein said portion of input data is a portion for encryption, and said securing step (c) is a step for selectively encrypting the portion of input data based on said shared parameters.

22. The method of claim 9, wherein said portion is a portion for encryption, and said step (g) is a step for selectively decoding the portion of the received data based on the shared parameters.

* * * * *